United States Patent
Kojima

(10) Patent No.: US 7,894,345 B2
(45) Date of Patent: Feb. 22, 2011

(54) NETWORK RESOURCE MANAGEMENT SYSTEM AND METHOD, AND RADIO CONTROL APPARATUS

(75) Inventor: Masahiko Kojima, Tokyo (JP)

(73) Assignee: NEC Corporation, Tokyo (JP)

(*) Notice: Subject to any disclaimer, the term of this patent is extended or adjusted under 35 U.S.C. 154(b) by 355 days.

(21) Appl. No.: 12/049,657

(22) Filed: Mar. 17, 2008

(65) Prior Publication Data

US 2008/0239962 A1 Oct. 2, 2008

(30) Foreign Application Priority Data

Mar. 30, 2007 (JP) ............................. 2007-090571

(51) Int. Cl.
*H04J 1/16* (2006.01)
(52) U.S. Cl. ..................................... 370/235; 370/468
(58) Field of Classification Search ................. 370/230, 370/230.1, 231, 232, 233, 234, 252, 253, 370/328, 329, 331, 468, 470, 471
See application file for complete search history.

(56) References Cited

U.S. PATENT DOCUMENTS

2007/0109986 A1* 5/2007 Kwak et al. ................. 370/316
2007/0133605 A1* 6/2007 Herrmann .................... 370/473
2007/0298800 A1* 12/2007 Williams et al. ............. 455/436
2008/0137564 A1* 6/2008 Herrmann .................... 370/310

FOREIGN PATENT DOCUMENTS

| JP | 08228226 A | 9/1996 |
| JP | 2000209274 A | 7/2000 |
| JP | 2003348137 A | 12/2003 |
| JP | 2006279923 A | 10/2006 |
| WO | 2003019897 A1 | 3/2003 |
| WO | 2006071179 A1 | 7/2006 |

OTHER PUBLICATIONS

European Search Report for EP Application No. 08006099.9 search completed Jul. 21, 2008.

* cited by examiner

*Primary Examiner*—Brian D Nguyen

(57) ABSTRACT

RNC includes an RNSAP protocol unit that receives a protocol message containing TFS (maximum number of blocks, TB size, TTI), a data definition unit that defines a first factor which is an average value of transport blocks and a second factor which is an average value of data size of a particular portion of an IP transport, and a resource management/CAC unit that calculates the amount of data on a user plane and the amount of data in the particular portion of the IP transport by using TFS that is included in the received protocol message and the first and second factors. The resource management/CAC unit employs the sum of the calculated amount of data on the user plane and amount of data in the particular portion as a band accumulated value for connection admission control.

10 Claims, 8 Drawing Sheets

Fig. 7

| Number of TB/Max TB | 3/4 | 1/4 | 0/4 | 2/4 | 0/4 | 0/4 | 4/4 | Ave=2.5/7=0.36 |
|---|---|---|---|---|---|---|---|---|
| Number of IP specific Header | 1 | 1 | 0 | 1 | 0 | 0 | 1 | Ave=4/7=0.57 |

NETWORK RESOURCE MANAGEMENT SYSTEM AND METHOD, AND RADIO CONTROL APPARATUS

This application is based upon and claims the benefit of priority from Japanese Patent Application No. 2007-090571 filed in the Japan Patent Office on Mar. 30, 2007, the contents of which are hereby incorporated by reference.

BACKGROUND OF THE INVENTION (1) Field of the Invention

The present invention relates to a radio system, and more particularly, to a resource management system for RAN (Radio Access Network) which is built by an IP (Internet Protocol) network.

(2) Description of the Related Art

RAN is basically comprised of a node B which is a radio base station device, and RNC (Radio Network Controller) which is a radio control apparatus. The node B is connected to UE (User Equipment) which is a mobile device through a radio interface. The RNC performs management of radio resources, control of node B, CAC (Connection Admission Control) process, handover control and the like. An Iub interface is defined as an interface between the node B and RNC, while an Iur interface is defined as an interface between RNCs.

In RAN which is built by an ATM (Asynchronous Transfer Mode) network, a clay pipe is built using ATM transport for transferring user data. TB (Transport Block) is used for transferring user data.

In the RAN described above, negotiations are made between nodes in order to establish and release a resource number (AAL2 Path ID, CID) for the clay pipe (TB) by a protocol called ALCAP. A resource in network is managed by performing the negotiations.

In the following, a description will be given of resource management in the ATM transport. Here, assume, as RNC, that SRNC (Serving RNC) and DRNC (Drift RNC) are installed.

FIG. 1 shows a resource management procedure upon resource capturing. Referring to FIG. 1, SRNC first transmits an RNSAP message "Radio Setup Request" to DRNC, and DRNC which has received the message transmits an NBAP message "Radio Setup Request" to node B. In response to the NBAP message from DRNC, node B transmits an NBAP message "Radio Setup Response" to DRNC. Upon receipt of the response message from node B, DRNC transmits an RNSAP message "Radio Setup Response" to SRNC. In this way, a radio link setup (connection setup) is performed by passing the RNSAP message and NBAP message among respective nodes such as SRNC, DRNC, and node B.

After setting up the radio link, resource allocation and CAC are performed in each of the Iur and Iub interfaces by transmitting and receiving ALCAP-based messages among the respective nodes SRNC, DRNC, and node B. CAC is software control for determining whether or not a connection setup can be admitted. CAC rejects the admission of a call if the quality of communication cannot be guaranteed due to a lack of network resources, taking into consideration the band and required QoS (Quality of Service) conditions, in order to ensure communication quality.

With Iur, an ERQ (Establish Request) message is passed from SRNC to DRNC. The ERQ message includes parameters such as "Peak CPS SDU Bit rate," "Peak CPS SDU Size," "Average CPS SDU Bit rate," "Average CPS SDU size," "AAL2 path ID (VPCI+VCI)," "CID," and the like. Here, parameters related to resources are "AAL2 path ID" and "CID," and resources are allocated using these parameters.

In regard to CAC, the value of [band of previously assigned resources]+[Average CPS SDU Bit rate/Average CPS SDU size] is calculated using parameters "Average CPU SDU Bit rate" and "Average CPS SDU size," and the calculation result is compared with an allowance for a band of VCI. When the calculation result is equal to or smaller than the allowance, the admission of resources is permitted, whereas when the calculation result exceeds the allowance, the admission of resources is rejected.

Likewise, with Iub, the ERQ message is passed between DRNC and nodes, and the allocation of resources and CAC are performed using parameters included in the ERQ message in a manner similar to Iur.

FIG. 2 shows a resource management procedure when resources are released. Referring to FIG. 2, SRNC first transmits an RNSAP message "Radio Reconfiguration Prepare" to DRNC, and DRNC, which has received the message, transmits an NBAP message "Radio Reconfiguration Ready" to node B. Upon receipt of the message from DRNC, node B transmits an NAP message "Radio Configuration Ready" to DRNC. Upon receipt of the message from node B, DRNC transmits an RNSAP message "Radio Reconfiguration Response" to SRNC.

Upon receipt of the response message from DRNC, SRNC transmits an RRC message "Radio Bearer Release Request" to node B. Subsequently, ALCAP-based REL (Release Request message) and RLC (Release Complete message) are passed among the respective nodes, SRNC, DRNC, and node B to releases and to update a CAC band accumulated value in each of the Iur and Iub interfaces.

In order to determine whether or not a band value declared by the user upon Bear establishment is a band which can be processed by an ATM transport, the band value declared by the new user upon Bear establishment is added to the total value of previously established users' Bear bands, and the sum is compared with the capacity of the ATM transport (physical pipe diameter). The addition of a band value declared by a new user to the total value of previously established users' Bear bands is called "CAC band accumulation." The CAC band accumulated value is given by [Σ (previously established per-user Bear band value)+(Bear band value newly established this time)].

Incidentally, a next-generation network employs RAN which is built by an IP (Internet Protocol) network. In this IP-based RAN, a resource management method has been proposed on assumption of IP services.

JP-2006-279923-A discloses a method of managing one or a plurality of IP-based resources in a packet-based access network. In this resource management method, at least one IP-based resource is validated for a particular user from among a first wireless connection through a first interface and a second wireless connection which becomes active at the same time through a second interface. Next, during a particular service for a particular user, information indicative of transmission of a plurality of packets is delivered through the first and second wireless connections and wired line connections. Then, based on associated information, at least one connection is selected from among the first and second wireless connections and wired line connections, to determine routing of the plurality of packets in the packet-based access network.

However, the foregoing related art has the following problems.

Since no special protocol exists for establishing TB, such as ALCAP, in the IP-based RAN, the resource management cannot be applied in ALCAP as shown in FIGS. 1 and 2.

The IP-based resource management method described in JP-2006-279923 assumes IP services in an IP network which terminates at UE and HA (Home agent) and is intended for processes on a user data layer. Accordingly, this resource management method would encounter difficulties when applied to resource management in IP transport at the RNC level.

Thus, the resource management in the IP transport at RNC level has not so far been realized in the IP-based RAN.

SUMMARY OF THE INVENTION

It is an exemplary object of the present invention to solve the problem mentioned above and to provide a network resource management system and method, and a radio control apparatus which are capable of managing resources in an IP transport at an RNC level.

To achieve the above object, a network resource management system according to an exemplary aspect of the present invention comprises:

a first radio control apparatus connected to a radio base station device through a first interface through which data is transmitted and received in units of transport blocks through an IP transport; and a second radio control apparatus connected to the first radio control apparatus through a second interface through which the data is transmitted and received through the IP transport, wherein the second radio control apparatus transmits a protocol message to the first radio control apparatus, the protocol message containing radio parameters that include a maximum number of blocks transmitted in a transport block set which is a set of the transport blocks, a size of the transport block, and a time interval at which the transport block set is transmitted, and the first radio control apparatus defines a first factor which is an average value of the transport blocks and a second factor which is an average value of a data size of a particular portion of the IP transport, the first and second factors being previously acquired for data transmitted in the transport block set, the first radio control apparatus multiplies a maximum bit rate of the transport block by the first factor to calculate the amount of data on a user plane, the transport block being derived on the basis of the maximum number of blocks, the size of transport blocks, and the time interval which are included in the protocol message received from the second radio control apparatus, the first radio control apparatus divides the data size of the particular portion of the previously given IP transport by the time interval, and multiplies the resulting value by the second factor to calculate the amount of data in the particular portion of the IP transport, and the first radio control apparatus uses the sum of the amount of data on the user plane and the amount of data in the particular portion as a band accumulated value for connection admission control in the first and second interfaces, and executes assignment of resources in the first and second interfaces when the band accumulated value is within a defined band, and rejects the assignment of resources in the first and second interfaces when the band accumulated value exceeds the defined band.

A radio control apparatus according to an exemplary aspect of the present invention which is connected to another radio control apparatus through an IP interface through which data is transmitted and received in units of transport blocks through an IP transport, the apparatus comprises:

a protocol unit that receives from the other radio control apparatus a protocol message containing radio parameters that include a maximum number of blocks transmitted in a transport block set which is a set of the transport blocks, the size of the transport block, and a time interval at which the transport block set is transmitted;

a data definition unit that defines a first factor which is an average value of the transport blocks and a second factor which is an average value of a data size of a particular portion of the IP transport, the first and second factors being previously acquired for data transmitted in the transport block set; and a connection admission control unit that multiplies the maximum bit rate of the transport block, derived on the basis of the maximum number of blocks, the size of transport blocks, and the time interval which are included in the protocol message which is received from the other radio control apparatus, by the first factor to calculate the amount of data on a user plane, and that divides the data size of the particular portion of the previously given IP transport by the time interval to multiply the resulting value by the second factor to calculate the amount of data in the particular portion of the IP transport, and that uses the sum of the calculated amount of data on the user plane and the calculated amount of data in the particular portion as a band accumulated value for connection admission control in the interface, wherein the connection admission control unit executes assignment of resources in the interface when the band accumulated value is within a defined band, and rejects the assignment of resources in the interface when the band accumulated value exceeds the defined band.

A network resource management method according to an exemplary aspect of the present invention which is performed in a radio control apparatus connected to another radio control apparatus through an interface through which data is transmitted and received in units of transport blocks through an IP transport, the method comprises:

receiving from the other radio control apparatus a protocol message containing radio parameters that include a maximum number of blocks transmitted in a transport block set which is a set of the transport blocks, a size of the transport block, and a time interval at which the transport block set is transmitted;

defining a first factor which is an average value of the transport blocks and a second factor which is an average value of a data size of a particular portion of the IP transport, the first and second factors being previously acquired for data transmitted in the transport block set;

multiplying a maximum bit rate of the transport block, derived on the basis of the maximum number of blocks, size of transport blocks, and time interval which are included in the protocol message which is received from the other radio control apparatus, by the first factor to calculate the amount of data on a user plane;

dividing the data size of the particular portion of the previously given IP transport by the time interval, and multiplying the resulting value by the second factor to calculate the amount of data in the particular portion of the IP transport; and using the sum of the calculated amount of data on the user plane and the calculated amount of data in the particular portion as a band accumulated value for connection admission control in the interface to execute assignment of resources in the interfaces when the band accumulated value is within a defined band and to reject the assignment of resources in the interface when the band accumulated value exceeds the defined band.

The above and other exemplary purposes, features, and advantages of the present invention will become apparent from the following description with reference to the accompanying drawings which illustrate examples of the present invention.

BRIEF DESCRIPTION OF THE DRAWINGS

In the accompanying drawings:

FIG. 7 is a diagram for describing average values of IP-specific header and TB, respectively, of TBS shown in FIG. 6.

DETAILED DESCRIPTION OF THE EXEMPLARY EMBODIMENT

Figure 1:
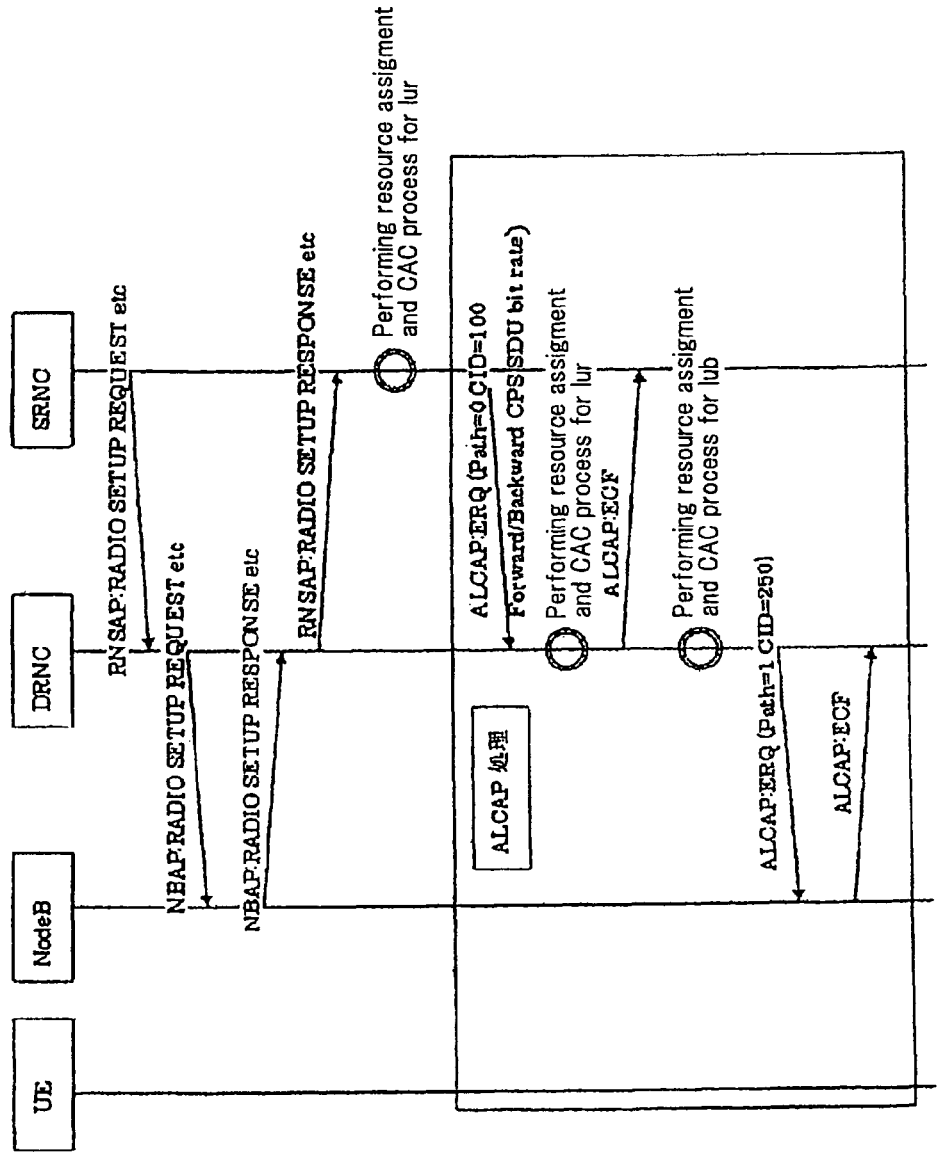
FIG. 1 is a diagram for describing a resource management procedure upon resource capturing in ATM-based RAN.
Figure 2:
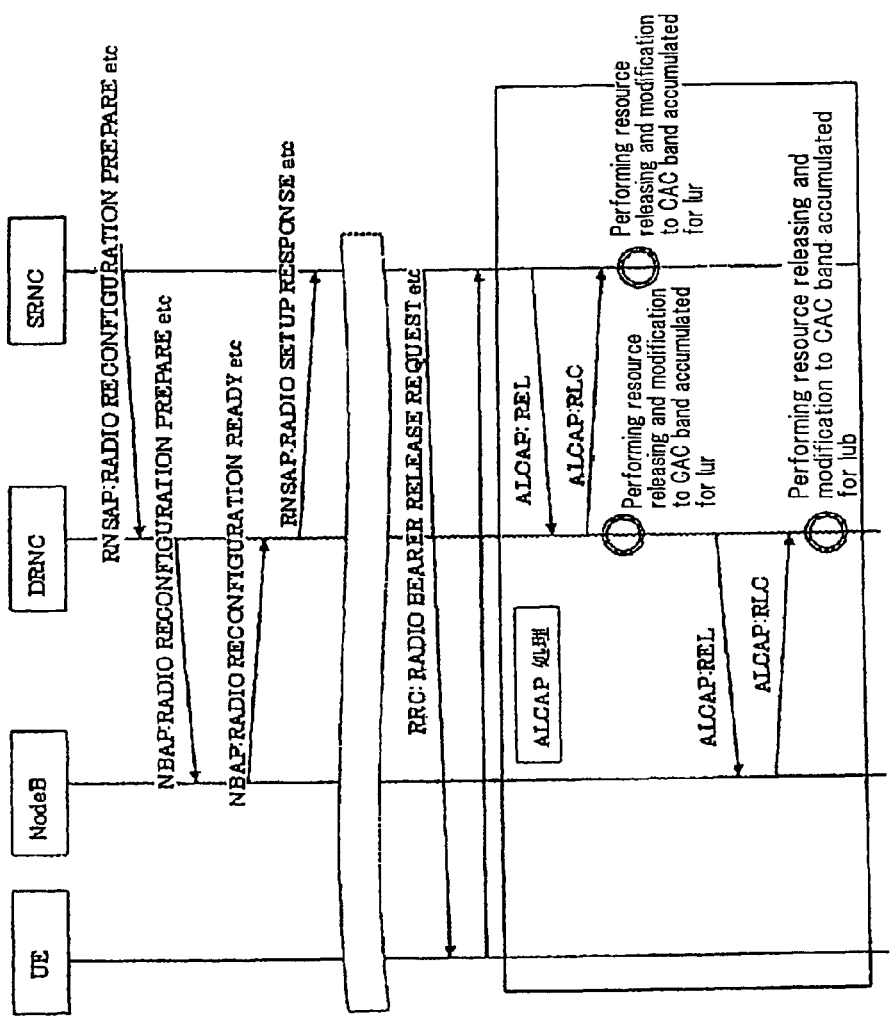
FIG. 2 is a diagram for describing a resource management procedure upon resource releasing in the ATM-based RAN.
Figure 3:
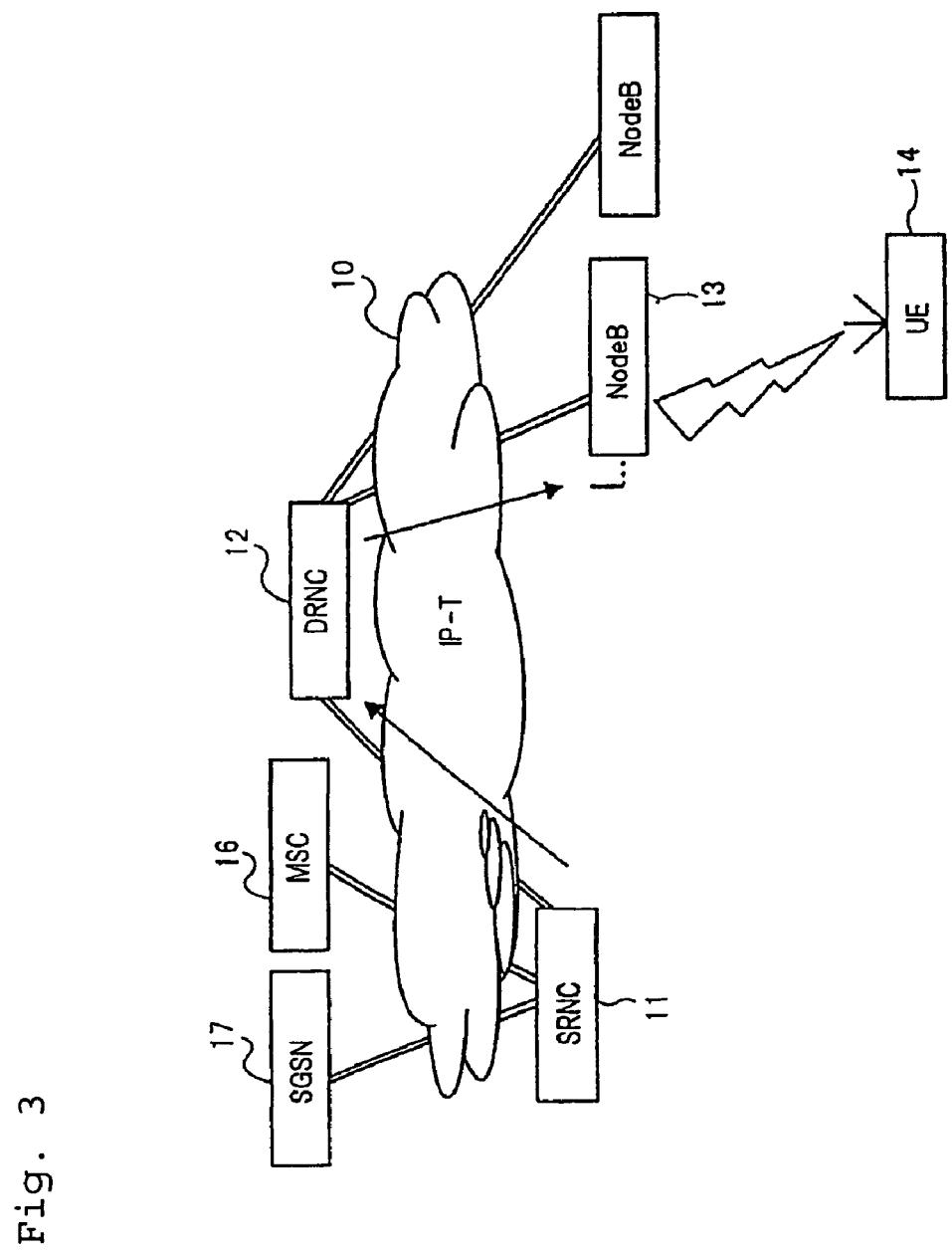
FIG. 3 is a schematic diagram showing the configuration of an IP transport network system to which an IP-based network resource management system is applied in accordance with an exemplary embodiment of the present invention.

FIG. 3 is a schematic diagram showing the configuration of an IP transport network system to which an IP-based network resource management system is applied according to an exemplary embodiment of the present invention.

Referring to FIG. 3, the IP transport network includes a plurality of nodes B 13 connected to UE 14, which is a mobile device, through a radio interface; DRNC 12 to which these nodes B 13 are connected through IP transport 10; and SRNC 11 to which DRNC 12 is connected through IP transport 10.

IP-based RAN is made up of IP transport 10, SRNC 11, DRNC 12, and nodes B 13. The Iub interface is defined as an interface between nodes B 13 and DRNC 12, while the Iur interface is defined as an interface between DRNC 12 and SRNC 11. Nodes B 13 are radio base station devices.

SRNC 11 and DRNC 12, both of which are radio control apparatuses (RNC), manage resources and perform CAC processes in each of the Iub and Iur interfaces in addition to operations in existing RNC such as control of nodes B, handover control and the like. MSC (Mobile Switching center) 16 and SGSN (Serving GPRS Support Node) 17 are connected to SRNC 11 through IP transport 10.

MSC 16 controls transfers of text data in limited sizes. SGSN 17, which is a subscriber node connected to RAN, manages information related to subscribers of mobile devices which exist in the coverage (subscriber information such as available QoS service class, information on connectable destinations, authentication information and the like). The subscriber information is supplied from HLP (Home Location Register) to SGSN 17 upon powering up the UE. SGSN 17 performs connection control based on the subscriber information upon initiation and termination of call from and to UE 14. Since UE 14, MSC 16, and SGSN 17 are existing ones, detailed descriptions thereon are omitted herein.

Figure 4:
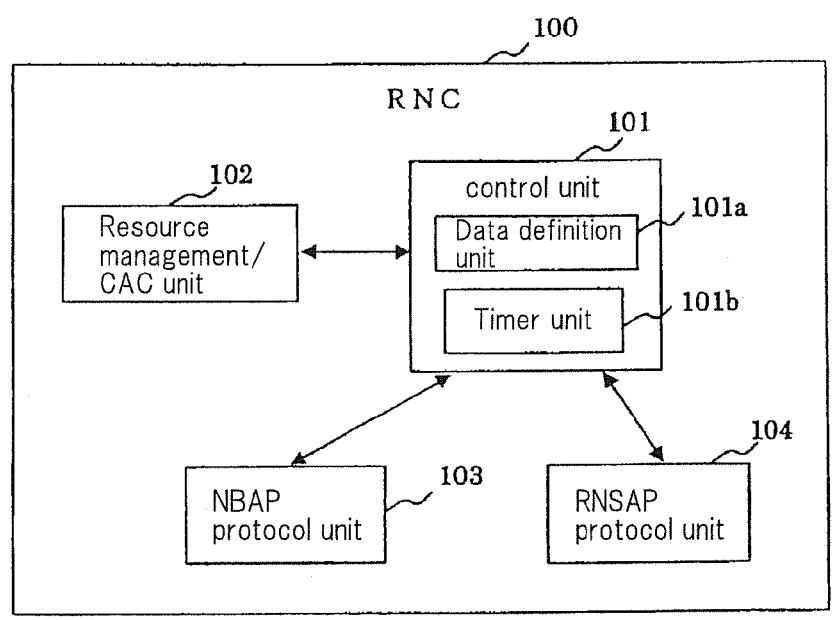
FIG. 4 is a block diagram showing a main portion of RNC which is applied to SRNC and DRNC shown in FIG. 3.

SRNC 11 and DRNC 12 are basically the same in configuration. FIG. 4 shows a main portion of RNC which is applied to SRNC 11 and DRNC 12. Referring to FIG. 14, RNC 100 includes control unit 101, resource management/CAC unit 102, NBAP protocol unit 103, and RNSAP protocol unit 104. Resource management/CAC unit 102 comprises a resource management function unit and a CAC function unit. Control unit 101 includes data definition unit 101a and timer unit 101b.

In the following, a description will be given of the operation of each component in SRNC 11 and DRNC 12.
(1) SRNC 11:

Resource management/CAC unit 102 implements management of station data, and resource management and CAC processes in the Iur interface. The CAC processes involve calculating a required band (band accumulation) with reference to TFS (Transport Format Set). The station data is a database defined on a station-by-station basis, and defines parameters such as activity factors AF#1, AF#2, TFS, later described, on a service-by-service basis.

RNSAP protocol unit 104 creates an RNSAP message with reference to the station data and information that is required for resource management and that is supplied from higher-rank devices, and transmits the RNSAP message to DRNC 12 through the Iur interface. The RNSAP message includes information such as the IP address of SRNC 11, the UDP port number and TFS of SRNC 11, and the like. Here, resources are the IP address and UDP port number.

Resource management/CAC unit 102 assigns resources which are not used in the Iur interface (IP address and UDP port number). In the assignment of resources, resource management/CAC unit 102 executes the assignment of resources when the result of a band calculation in the CAC process falls within a defined band. If the result of the band calculation in the CAC process exceeds the defined band, resource management/CAC unit 102 rejects the assignment of resources.

Data definition unit 101a monitors TBS (Transport Block Set) transmitted through the Iur interface, and defines active factor AF#1, for calculating the amount of data on a user plane, for each bear service and rate for a radio data throughput of the user plane in the station data. Similar to this, data definition unit 101a also defines active factor AF#2 for calculating the amount of data in a particular portion of the IP transport in the station data. Active factors AF#1, AF#2 are utilized when the band accumulation is calculated in the CAC process. This band accumulated value A is given by the following equation:

$$A = [\text{TB maximum value} * \text{TB size}/TTI] * AF\#1 + [\text{header size}/TTI] * AF\#2 \quad \text{(Equation 1)}$$

where active factor AF#1 is an average of TB, and active factor AF#2 is an average of the header size of the IP transport.

NBA protocol unit 103 passes an RRC message to/from node B. Upon receipt of an RRC message from node B, control unit 101 performs a process for releasing resources, and a modification to the CAC band accumulated value.
(2) DRNC 12:

Resource management/CAC unit 102, which is similar to that of SRNC 11, performs management of station data, and management of resources and CAC processes in each of the Iur and Iub interfaces.

RNSAP protocol unit 104 transmits and receives an RNSAP message to and from SRNC 11 through the Iur interface. The RNSAP message transmitted to SRNC 11 by RNSAP protocol unit 104 includes information such as the IP address of DRNC 12, the UDP port number and TFS of DRNC 12, and the like. Here, resources are the IP address and UDP port number.

Resource management/CAC unit 102 assigns resources which are not used in the Iur interface (IP address and UDP port number). In the assignment of resources, resource management/CAC unit 102 executes the assignment of resources when the result of a band calculation in the CAC process falls within a defined band. If the result of the band calculation for the Iub interface in the CAC process exceeds the defined band, resource management/CAC unit 102 rejects the assignment of resources.

Data definition unit 101a monitors TBS transmitted through the Iur interface, and defines active factor AF#1 for calculating the amount of data on a user plane for each bear service and rate for a radio data throughput of the user plane in the station data. Similar to this, data definition unit 101a also defines active factor AF#2 for calculating the amount of data in a particular portion of the IP transport in the station data. Active factors AF#1, AF#2 related to the Iub interface are utilized when the band accumulation is calculated in the CAC process. This band accumulated value is also given by Equation 1 mentioned above.

NBA protocol unit 103 passes an NBAP message to/from node B 13 through the Iub interface. The NBAP message includes information such as the IP address of DRNC 12, the UDP port number and TFS of DRNC 12, and the like. Here, the resources are the IP address and UDP port number.

Resource management/CAC unit 102 assigns resources (IP address and UDP port number) which are not used in the Iub interface. In the assignment of resources, resource management/CAC unit 102 executes the assignment of resources when the result of a band calculation in the CAC process falls within a defined band. If the result of the band calculation for the Iub interface in the CAC process exceeds the defined band, resource management/CAC unit 102 rejects the assignment of resources.

Data definition unit 101a monitors TBS transmitted through the Iub interface, and defines active factor AF#1 for calculating the amount of data on a user plane for each bear service and rate for a radio data throughput of the user plane in the station data. Similar to this, data definition unit 101a also defines active factor AF#2 for calculating the amount of data in a particular portion of the IP transport in the station data. These active factors AF#1, AF#2 related to the Iub interface are utilized when the band accumulation is calculated in the CAC process. This band accumulated value is also given by Equation 1 mentioned above.

Timer unit 101b is set to be woken up at a timing at which an RNSAP (Radio Link Reconfiguration Prepare) is received from SRNC 11 and to time out when a certain time elapses after starting. Resource management/CAC unit 102 releases resources in each of the Iub and Iur interfaces and changes the CAC band accumulated value at the timing timer unit 101b times out.

Next, a specific description will be given of the resource management operation of the IP transport network system of this embodiment.

(Resource Capturing)

Figure 5:
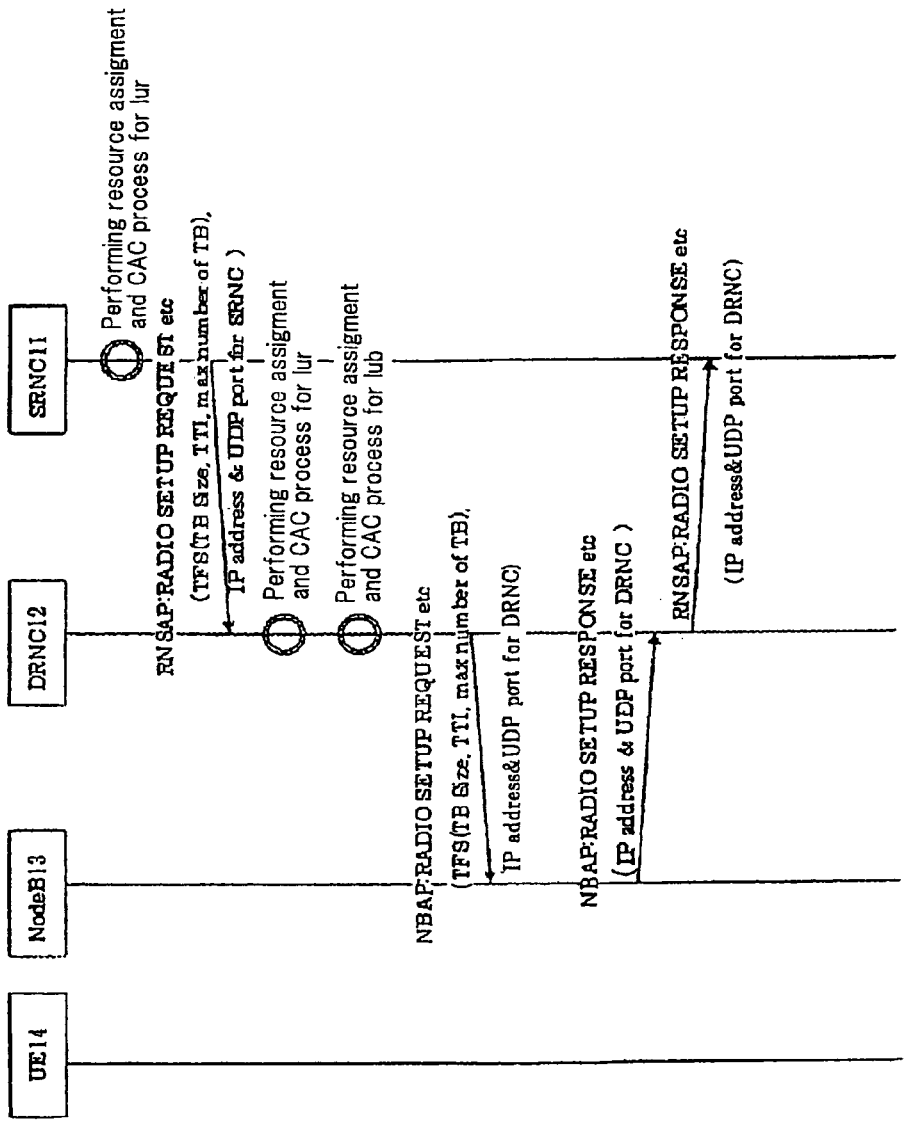
FIG. 5 is a diagram for describing the operation during resource capturing in the IP transport network system shown in FIG. 3.

FIG. 5 shows the operation during resource capturing. Referring to FIG. 5, SRNC 11 first starts a resource assignment and a CAC process for the Iur interface, and transmits an RNSAP message, which includes TFS (TB size, TTI, TB maximum value), IP address and UDP port number of SRNC 11, to DRNC 12. The resource assignment and CAC process performed for the Iur interface by SRNC 11 are based on the TFS and IP address and UDP port number of SRNC 11, included in the RNSAP message transmitted to DRNC 12.

Upon receipt of the RNSAP message, DRNC 12 starts the resource assignment and CAC process for each of the Iur and Iub interfaces, and transmits an NBAP message, which includes TFS (TB size, TTI, TB maximum value), and the IP address and UDP port number of SRNC 11, to node B 13. The resource assignment and CAC process performed for the Iur interface by DRNC 12 are based on the TFS and the IP address and UDP port number of SRNC 11, included in the RNSAP message received from SRNC 11. On the other hand, the resource assignment and CAC process performed for the Iub interface by DRNC 12 are based on the TFS and the IP address and UDP port number of SRNC 11, included in the NBAP message transmitted to node B 13.

Upon receipt of the NBAP message, node B 13 transmits a response message to DRNC 12. Upon receipt of the response message, DRNC 12 transmits the response message to the RNSAP message received from SRNC 11 to SRNC 11.

In the foregoing procedure, resource management unit/CAC unit 102 performs the band accumulation taking into consideration active factors AF#1, AF#2 in each of two processes, one process in which the resource assignment and CAC process in the Iur interface are performed by SRNC 11, the other process in which the resource assignment and CAC process in each of the Iur and Iub interfaces are performed by DRNC 12.

In the following, a specific description will be given of the band accumulation in CAC into consideration active factors FA#1, FA#2.

Figure 6:
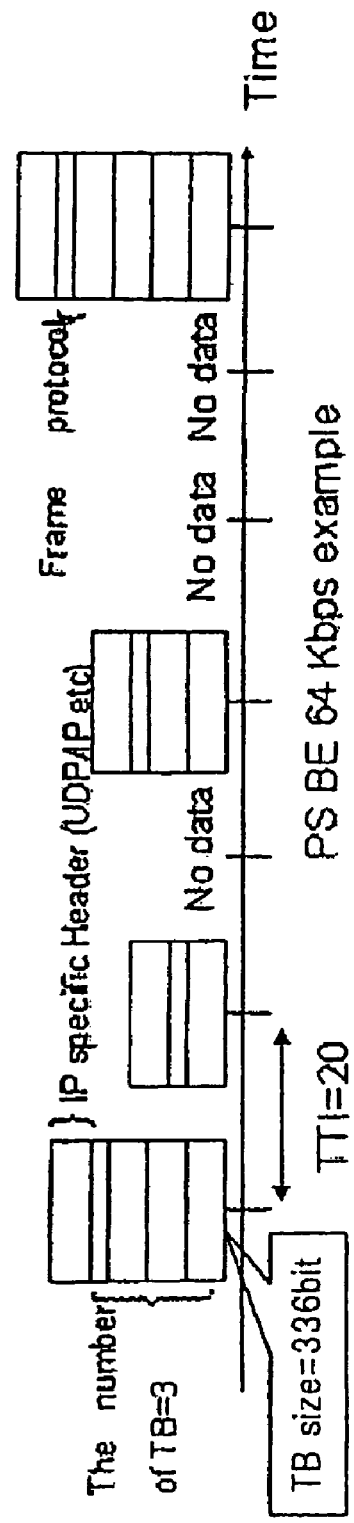
FIG. 6 is a schematic diagram for describing TBS which is transmitted through an Iur interface.

FIG. 6 schematically shows TBS transmitted through the Iur interface. Referring to FIG. 6, TBS, which supports IPv4, includes an IP-specific header, and TB. The IP-specific header includes a header of UDP/IP. TB has a size of 336 bits. TTI is 20 ms. An FP header is 16 bits, and a maximum bit rate is 68 Kbps (=336*4+16).

In the example of FIG. 6, TBS with four TBs is transmitted in a first TTI period. In a second and a third TTI period, no TB is transmitted. In a fourth TTI period, TBS with two TBs is transmitted. In a fifth TTI period, no TB is transmitted. In a sixth TTI period, TBS with one TB is transmitted. In a seventh TTI period, TBS with three TBs is transmitted.

FIG. 7 shows average values of the IP-specific header and TB of TBS shown in FIG. 6. The value of TB (the number of TBs divided by a maximum value of TBs) in the first, second, third, fourth, fifth, sixth, and seventh TTI periods are 4/4, 0/4, 0/4, 2/4, 0/4, 1/4, 3/4, respectively. Thus, the average value of TBs in the first to seventh TTI periods is 0.36. Data definition unit 101a defines this average value (0.36) of TB as active factor AF#1. Then, data definition unit 101a calculates:

(AF#1*TB maximum value*TB size+FP header length)/$TTI$=25.0 Kbps as the amount of data on the user plane for the band accumulation of CAC.

Also, since TBSs are transmitted only in the first, fourth, sixth, and seventh TTI periods, the average value of IP-specific header values in the first to seventh TTI periods is 0.57 (=4/7). Data definition unit 101a defines this average value of IP-specific header as active factor AF#2. Then, data definition unit 101a calculates the amount of data of IP transport for the band accumulation of CAC taking into consideration active factor AF#2.

In the case of UDP where the IP-specific header supports three headers, i.e., a header (8*8=64 bits)+IPv6, a header (20*8=160 bits)+L2, and a header (22*8=176 bits), the size (bit length) of the IP-specific header amounts to 400 bits which are the sum of these headers. In this event, data definition unit 101a calculates:

AF#2*IP-specific header length/TTI=11.4 Kbps as the amount of data of IP transport for the band accumulation of CAC.

Resource management/CAC unit 102 performs the band accumulation of CAC based on the sum of the amount of data on the user plane (25.0 Kbps) and the amount of data of the IP transport (11.4 Kbps). In other words, this sum is band accumulated value A calculated by the aforementioned Equation 1.

(Resource Releasing)

Figure 8:
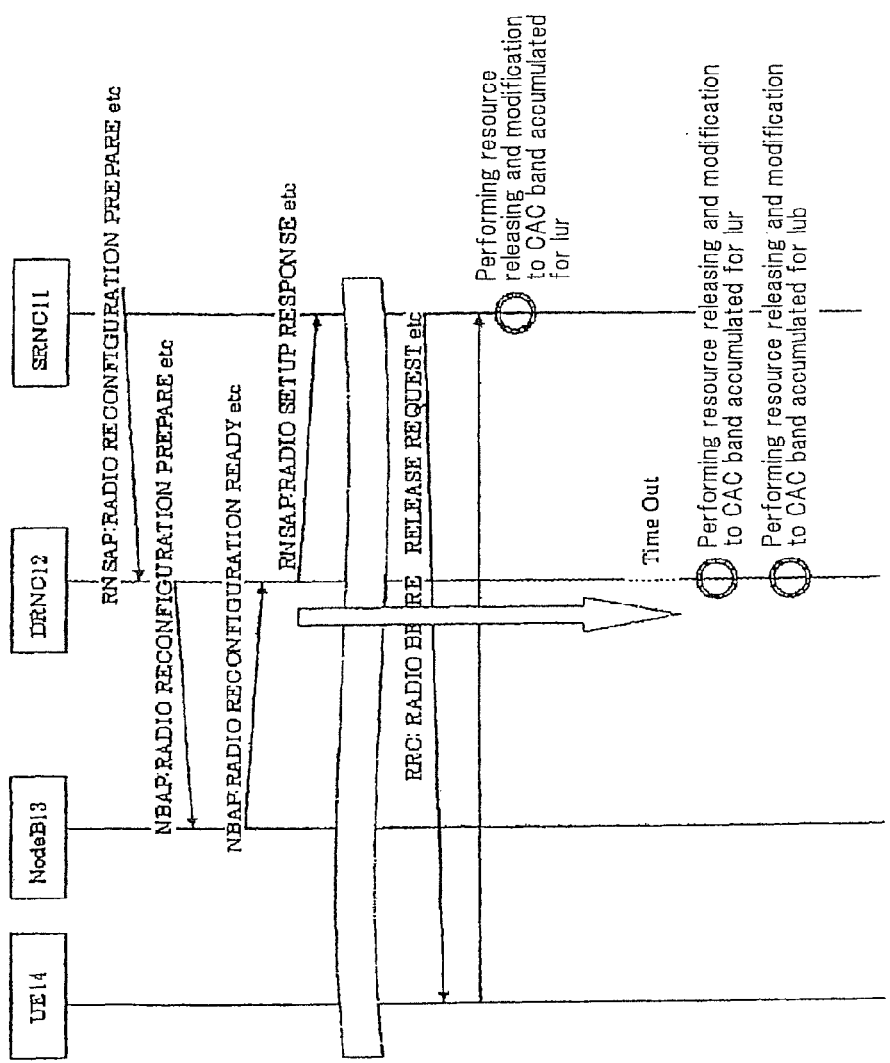
FIG. 8 is a diagram for describing the operation during resource releasing in the IP transport network system shown in FIG. 3.

FIG. 8 shows the operation during resource releasing. Referring to FIG. 8, SRNC 11 first transmits an RNSAP message (Radio Reconfiguration Prepare) to DRNC 12. Upon receipt of the RNSAP message, DRNC 12 transmits an NBAP message (Radio Reconfiguration Prepare) to node B 13, and simultaneously activates timer unit 101b.

Upon receipt of the NBAP message, node B 13 transmits an NBAP message (Radio Reconfiguration Ready) to DRNC 12. Upon receipt of the NBAP message, DRNC 12 transmits an RNSAP message (Radio Reconfiguration Response) to SRNC 11.

Upon receipt of the RNSAP message, SRNC 11 transmits an RRC message (Radio Bearer Release Request) to node B 13. Node B 13 transmits a response message to the RRC message to SRNC 11. Upon receipt of the response message, SRNC 11 performs resource releasing and a modification to the CAC band accumulated value.

As timer unit 101b times out, DRNC 12 performs resource releasing and a modification to the band accumulated value of CAC in each of the Iur and Iub interfaces. Timer unit 101b is set to time out after the RRC message has been passed between SRNC 11 and node B 13. In this way, it is possible to solve a problem in which DRNC 12 releases resources at a timing too early, causing data to drop.

The band accumulated value calculation approach, described in connection with resource capturing, is applied in the modification to the band accumulated value of CAC for the Iur interface in SRNC 11 and in the modification to the band accumulated value of CAC in each of the Iur and Iub interfaces in DRNC 12.

According to the IP transport network system of this embodiment described above, in each of DRNC and SRNC, as station data, AF#1 is defined as a factor for calculating the amount of data on the user plane so that a radio data throughput of the user plane is managed, and AF#2 is defined as a factor for calculating the amount of data in a particular portion (specifically, the IP-specific header) of the IP transport. The thus defined AF#1 and AF#2 are used to calculate the amount of data on the user plane and the amount of data in the particular portion of the IP transport, and the band accumulated value is calculated based on the result. In this way, resource management can be accomplished in the IP transport, and as a result, a service quality at a certain level or higher can be ensured, as is the case with ATM-based RAN, thus making it possible to prevent the occurrence of critical congestion.

Also, appropriate CAC can be implemented by defining appropriate factors (AF#1, AF#2) so as not to exclude expected subscribers (number of TBs) due to excessive band accumulation.

In resource management in the IP transport, there is an overhead in the header portion. Specifically, in the case of IP, there are a plurality of patterns as the header, and the respective patterns differ in the size (bit length) of the header. For example, the header size of IPv4 is different from the header size of IPv6. For this reason, if data of IPv4 flows through when the band accumulated value has been calculated, taking into consideration AF#2 corresponding to the header of IPv6, extra band is accumulated by the value (difference) of [header size of IPv6]-[header size of IPv4]. In this embodiment, AF#1 and AF#2 are defined on a service-by-service basis. In other words, AF#2 is defined for IPv6, IPv4, respectively. Therefore, with IPv4, the extra band accumulation can be restrained by using AF#2 which has been defined by that IPv4.

It should be noted that determination of IPv4 or IPv6 can be made with a parameter called Transport Layer Address of the RANAP message (RAB Assignment Request). This parameter has 4 octets in the case of IPv4, and 16 octets in the case of IPv6, so that IPv4 or IPv6 is determined by making use of this difference.

Also, when the amount of user data differs depending on services, the extra band accumulation can be restrained by switching AF#1 in accordance with each service.

The IP transport network system of this embodiment described above is an example of the present invention, and can be modified in configuration and operation as appropriate without departing from the spirit of the invention.

According to an exemplary aspect of the present invention, the network resource management system comprises:

a first radio control apparatus connected to a radio base station device through a first interface through which data is transmitted and received in units of transport blocks through an IP transport; and a second radio control apparatus connected to the first radio control apparatus through a second interface through which the data is transmitted and received through the IP transport, characterized in that:

the second radio control apparatus transmits a protocol message to the first radio control apparatus, the protocol message containing radio parameters that include a maximum number of blocks transmitted in a transport block set which is a set of the transport blocks, a size of the transport block, and a time interval at which the transport block set is transmitted, and the first radio control apparatus defines a first factor which is an average value of the transport blocks and a second factor which is an average value of a data size of a particular portion of the IP transport, the first and second factors being previously acquired for data transmitted in the transport block set, the first radio control apparatus multiplies a maximum bit rate of the transport block by the first factor to calculate the amount of data on a user plane, the transport block being derived on the basis of the maximum number of blocks, the size of transport blocks, and the time interval which are included in the protocol message received from the second radio control apparatus, the first radio control apparatus divides the data size of the particular portion of the previously given IP transport by the time interval, and multiplies the resulting value by the second factor to calculate the amount of data in the particular portion of the IP transport, and the first radio control apparatus uses the sum of the amount of data on the user plane and the amount of data in the particular portion as a band accumulated value for connection admission control in the first and second interfaces, and executes assignment of resources in the first and second interfaces when the band accumulated value is within a defined band, and rejects the assignment of resources in the first and second interfaces when the band accumulated value exceeds the defined band.

According to the foregoing configuration, information of TFS (Transport Format Set) which includes radio parameters is supplied from the second radio control apparatus (SRNC) to the first radio control apparatus (DRNC) through a protocol message (RNSAP message). This information of TFS includes a maximum number of blocks, size of transport block, and time interval, so that the first radio control apparatus (DRNC) can calculate a maximum bit rate of the transport block from these parameters.

Also, the first radio control apparatus (DRNC) defines the first factor (AF#1) which is an average value of transport blocks, and a second factor (AF#2) which is an average value of the data size of a particular portion of the IP transport, respectively. By multiplying the maximum bit rate of the transport block by the first factor (AF#1), the amount of data on the user plane can be calculated. The amount of data in the particular portion of the IP transport can be calculated by dividing the data size of the particular portion of the IP transport by the time interval, and by multiplying the resulting value by the second factor. The sum of the amount of data on the user plane and the amount of data in the particular portion of the IP transport is the band accumulated value for the connection admission control (CAC). This band accumulated value is based on determining whether or not resources can be assigned.

In this way, in the IP-based RAN which does not provide a special protocol for establishment and modification of TB such as ALCAP, DRNC which is positioned between UE and SRNC can acquire parameters required to perform band accumulation in CAC, and can manage resources based thereon.

As described above, according to the present invention, it is possible to ensure service quality at a certain level or higher and restrain the occurrence of critical congestion in the IP-based RAN, in a manner similar to the ATM-based RAN.

While exemplary embodiments of the present invention have been described using specific terms, such description is for illustrative purposes only, and it is to be understood that changes and variations may be made without departing from the spirit or scope of the following claims.

What is claimed is:

1. A network resource management system comprising:
  a first radio control apparatus connected to a radio base station device through a first interface through which data is transmitted and received in units of transport blocks through an IP transport; and
  a second radio control apparatus connected to said first radio control apparatus through a second interface through which the data is transmitted and received through the IP transport,
  wherein said second radio control apparatus transmits a protocol message to said first radio control apparatus, said protocol message containing radio parameters that include a maximum number of blocks transmitted in a transport block set which is a set of the transport blocks, a size of the transport block, and a time interval at which the transport block set is transmitted, and
  said first radio control apparatus defines a first factor which is an average value of the transport blocks and a second factor which is an average value of a data size of a particular portion of the IP transport, the first and second factors being previously acquired for data transmitted in the transport block set,
  said first radio control apparatus multiplies a maximum bit rate of the transport block by the first factor to calculate the amount of data on a user plane, the transport block being derived on the basis of the maximum number of blocks, the size of transport blocks, and the time interval which are included in the protocol message received from said second radio control apparatus,
  said first radio control apparatus divides the data size of the particular portion of the IP transport by the time interval, and multiplies the resulting value of the divide by the second factor to calculate the amount of data in the particular portion of the IP transport, and
  said first radio control apparatus uses the sum of the amount of data on the user plane and the amount of data in the particular portion as a band accumulated value for connection admission control in the first and second interfaces, and executes assignment of resources in the first and second interfaces when the band accumulated value is within a defined band, and rejects the assignment of resources in the first and second interfaces when the band accumulated value exceeds the defined band.

2. The network resource management system according to claim 1, wherein, upon receipt of a particular protocol message from said second radio control apparatus, said first radio control apparatus releases resources in the first and second interfaces after a certain time has elapsed from a reception timing at which said particular protocol message is received.

3. The network resource management system according to claim 1, wherein said particular portion of the IP transport is an IP header.

4. The network resource management system according to claim 1, wherein said first radio control apparatus defines the first and second factors on a service-by-service basis, and switches the first and second factors on a service-by-service basis when said first radio control apparatus calculates the amount of data on the user plane, and the amount of data in the particular portion of the IP transport.

5. A radio control apparatus connected to another radio control apparatus through an IP interface through which data is transmitted and received in units of transport blocks through an IP transport, comprising:
  a protocol unit that receives from said other radio control apparatus a protocol message containing radio parameters that include a maximum number of blocks transmitted in a transport block set which is a set of the transport blocks, the size of the transport block, and a time interval at which the transport block set is transmitted;
  a data definition unit that defines a first factor which is an average value of the transport blocks and a second factor which is an average value of a data size of a particular portion of the IP transport, the first and second factors being previously acquired for data transmitted in the transport block set; and
  a connection admission control unit that multiplies the maximum bit rate of the transport block, derived on the basis of the maximum number of blocks, the size of transport blocks, and the time interval which are included in the protocol message which is received from said other radio control apparatus, by the first factor to calculate the amount of data on a user plane, and that divides the data size of the particular portion of the IP transport by the time interval to multiply the resulting value of the divide by the second factor to calculate the amount of data in the particular portion of the IP transport, and that uses the sum of the calculated amount of data on the user plane and the calculated amount of data in the particular portion as a band accumulated value for connection admission control in the interface, wherein said connection admission control unit executes assignment of resources in the interface when the band accumulated value is within a defined band, and rejects the assignment of resources in the interface when the band accumulated value exceeds the defined band.

6. The radio control apparatus according to claim 5, further comprising:

another protocol unit connected to a radio base station device through another interface through which data is transmitted and received in units of the transport blocks through the IP transport, wherein said connection admission control unit executes assignment of resources in the other interface when the band accumulated value is within a defined band, and rejects the assignment of resources in the other interface when the band accumulated value exceeds the defined band.

7. The radio control apparatus according to claim 6, wherein, upon receipt of a particular protocol message from said other radio control apparatus, said connection admission control unit releases resources in the interface and the other interface after a certain time has elapsed from a reception timing at which said particular protocol message is received.

8. The radio control apparatus according to claim 5, wherein said particular portion of the IP transport is an IP header.

9. The radio control apparatus according to claim 5, wherein said data definition unit defines the first and second factors on a service-by-service basis, and switches the first and second factors on a service-by-service basis when said connection admission control unit calculates the amount of data on the user plane, and the amount of data in the particular portion of the IP transport.

10. A network resource management method performed in a radio control apparatus connected to another radio control apparatus through an interface through which data is transmitted and received in units of transport blocks through an IP transport, said method comprising:

receiving from said other radio control apparatus a protocol message containing radio parameters that include a maximum number of blocks transmitted in a transport block set which is a set of the transport blocks, a size of the transport block, and a time interval at which the transport block set is transmitted;

defining a first factor which is an average value of the transport blocks and a second factor which is an average value of a data size of a particular portion of the IP transport, the first and second factors being previously acquired for data transmitted in the transport block set;

multiplying a maximum bit rate of the transport block, derived on the basis of the maximum number of blocks, size of transport blocks, and time interval which are included in the protocol message which is received from said other radio control apparatus, by the first factor to calculate the amount of data on a user plane;

dividing the data size of the particular portion of the IP transport by the time interval, and multiplying the resulting value of the divide by the second factor to calculate the amount of data in the particular portion of the IP transport; and using the sum of the calculated amount of data on the user plane and the calculated amount of data in the particular portion as a band accumulated value for connection admission control in the interface to execute assignment of resources in the interfaces when the band accumulated value is within a defined band and to reject the assignment of resources in the interface when the band accumulated value exceeds the defined band.

* * * * *